US008431205B2

(12) United States Patent
Seidl

(10) Patent No.: US 8,431,205 B2
(45) Date of Patent: Apr. 30, 2013

(54) MULTI-PLY LABEL

(75) Inventor: Peter Seidl, Munich (DE)

(73) Assignee: Schreiner Group GmbH & Co. KG, Oberschleissheim (DE)

(*) Notice: Subject to any disclaimer, the term of this patent is extended or adjusted under 35 U.S.C. 154(b) by 302 days.

(21) Appl. No.: 12/807,221

(22) Filed: Aug. 31, 2010

(65) Prior Publication Data

US 2011/0052850 A1 Mar. 3, 2011

(30) Foreign Application Priority Data

Sep. 1, 2009 (DE) ..................... 20 2009 011 815 U

(51) Int. Cl.

| | |
|---|---|
| ***B32B 9/00*** | (2006.01) |
| ***B32B 33/00*** | (2006.01) |
| ***B32B 7/12*** | (2006.01) |
| ***B65D 65/28*** | (2006.01) |

(52) U.S. Cl.

USPC ....... 428/40.1; 428/41.8; 428/42.2; 428/42.3; 428/43; 428/343; 428/352; 428/354

(58) Field of Classification Search ................. 428/40.1, 428/41.8, 42.2–43, 343, 352, 354

See application file for complete search history.

(56) References Cited

U.S. PATENT DOCUMENTS

| | | | | |
|---|---|---|---|---|
| 4,312,523 | A | 1/1982 | Haines | |
| 4,446,183 | A * | 5/1984 | Savagian | 428/42.3 |
| 4,921,277 | A | 5/1990 | McDonough | |
| 5,048,870 | A | 9/1991 | Mangini et al. | |
| 5,472,756 | A | 12/1995 | Sechet | |
| 5,829,789 | A * | 11/1998 | Treleaven et al. | 283/81 |
| 5,881,597 | A | 3/1999 | Brooks | |
| 6,193,279 | B1 | 2/2001 | Seidl | |
| 2004/0041392 | A1 | 3/2004 | Seidl | |
| 2004/0071917 | A1 | 4/2004 | Unglert | |
| 2004/0244242 | A1 | 12/2004 | Maliner et al. | |
| 2006/0000913 | A1 | 1/2006 | O'Rell et al. | |
| 2006/0107563 | A1 | 5/2006 | Farmsworth et al. | |
| 2008/0150275 | A1 | 6/2008 | Raistrick | |
| 2008/0303265 | A1 | 12/2008 | Kaufman | |
| 2010/0215876 | A1 | 8/2010 | Seidl | |

FOREIGN PATENT DOCUMENTS

| | | |
|---|---|---|
| DE | 693 09 233 | 10/1997 |
| DE | 197 46 011 | 1/1999 |
| DE | 102 39 510 | 3/2004 |
| DE | 203 08 796 | 10/2004 |
| DE | 10 2004 043 301 | 3/2006 |
| EP | 1 276 089 | 1/2003 |
| EP | 1 394 600 | 3/2004 |
| WO | WO 99/21156 | 4/1999 |

* cited by examiner

*Primary Examiner* — Patricia Nordmeyer
(74) *Attorney, Agent, or Firm* — Collard & Roe, P.C.

(57) ABSTRACT

A multi-ply label includes a first material ply (10), having at least a first and a second material section (110, 120), in which the first material section (110) of the first material ply (10) can be separated from the second material section (120) of the first material ply, and a second material ply (20), having at least a first and a second material section (210, 220), in which the first material section (210) of the second material ply can be separated from the second material section (220) of the second material ply. The first and second material plies (10, 20) are arranged above each other and with respect to each other such that the first material section (210) of the second material ply is separated from the second material section (220) of the second material ply when the first material section (110) of the first material ply (10) is separated from the second material section (120) of the first material ply and the first material section (210) of the second material ply (20) adheres to the first material section (110) of the first material ply (10).

25 Claims, 5 Drawing Sheets

MULTI-PLY LABEL

CROSS REFERENCE TO RELATED APPLICATIONS

Applicant claims priority under 35 U.S.C. §119 of German Application No. 20 2009 011 815.0 filed on Sep. 1, 2009, the disclosure of which is incorporated by reference.

BACKGROUND OF THE INVENTION

1. Field of the Invention

The invention relates to a multi-ply label, which has a plurality of removable sections that can be used as record labels.

2. Description of the Related Art

A multiplicity of pharmaceutical products is offered in a multi-dose variant. The pharmaceutical active ingredient, for example a liquid, is filled into a small container, from which individual quantities of the liquid can be removed. By way of example, heparin sodium is such a pharmaceutical product and it is stored in containers with a capacity of approximately one milliliter, in so-called 1 ml vials. A plurality of individual portions of the liquid are removed from the tiny vials and are filled into an injection device, for example a syringe, for injecting the active ingredient.

In order to avoid pharmaceutical risks, the injection devices must be labelled by a label, which contains at least the name of the product and the concentration of the active ingredient. The label is subsequently stuck onto an injection device such that the classification attached thereto remains uncovered. A multiplicity of such individual labels can for example be arranged on a large-area support material. In order to label the injection device, one of the labels can for example in each case be pulled off the large-area support material and can be stuck onto the injection device. The individual labels can be pre-labelled or can be subsequently labelled by the medical personnel. However, this harbors the risk of providing an injection device with either the wrong label or incorrectly labelling the label attached to said device.

SUMMARY OF THE INVENTION

It is desirable for a label to be provided whose use avoids, with a high probability, the incorrect labelling of products, more particularly of injection devices.

According to one possible embodiment, a multi-ply label comprises a first material ply, having at least a first and a second material section, the first material ply being designed such that the first material section of the first material ply can be separated from the second material section of the first material ply. The label furthermore comprises a second material ply, having at least a first and a second material section, the second material ply being designed such that the first material section of the second material ply can be separated from the second material section of the second material ply. The second material ply is arranged above the first material ply. The first and second material plies are arranged with respect to each other such that the first material section of the second material ply is separated from the second material section of the second material ply when the first material section of the first material ply is separated from the second material section of the first material ply and the first material section of the second material ply adheres to the first material section of the first material ply.

The specified label is suitable both for labelling a storage container containing a relatively large amount of a pharmaceutical active ingredient and for labelling injection devices into which respective individual portions of the active ingredient can be filled from the storage container. The material sections from the first and second material plies adhering to each other in each case form one record label. The individual record labels can be separated from each other and can be relabelled from the storage container to an injection device into which the smaller individual amount of the active ingredient contained in the storage container has been filled into. Since the two material plies are attached one above the other and the material sections of the first and second material plies overlap, the label can have a multiplicity of record labels, with the entire label, containing the record labels, having a length that can easily be processed in labelling machines.

Further embodiments of the label can be gathered from the discussion below.

BRIEF DESCRIPTION OF THE DRAWINGS

Hereinbelow, the invention will be explained in more detail with the aid of figures that show exemplary embodiments of the present invention.

In the drawings.

DETAILED DESCRIPTION OF PREFERRED EMBODIMENTS

Figure 1:
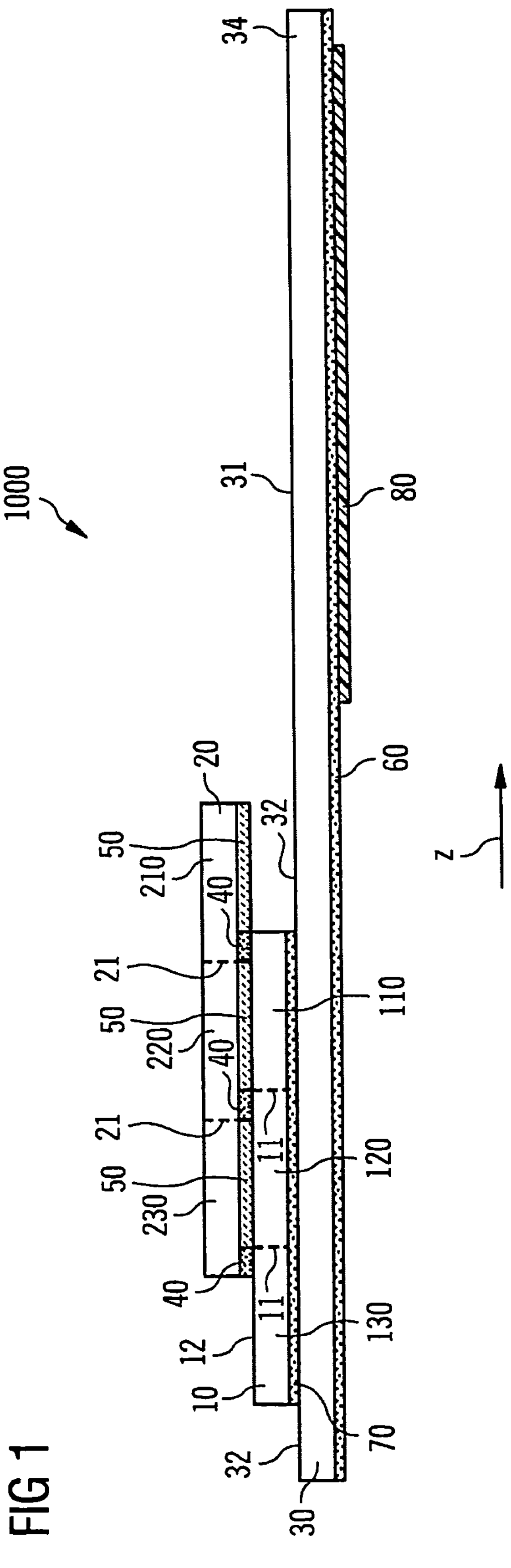
FIG. 1 shows an embodiment of a multi-ply label with record labels in a cross-sectional view.

FIG. 1 shows an embodiment of a multi-ply label 1000. The label has a support layer 30, which is coated on the underside thereof with a contact-adhesive layer 60. An adhesive-covering film 80 is partly arranged over the contact-adhesive layer 60. This interrupts the adhesive effect of the contact-adhesive layer 60 in the region of the support layer 30 to which the adhesive-covering film 80 is attached. The adhesive-covering film 80 is arranged such that the support layer 30 is subdivided on the underside into a relatively large contact-adhesive region, by means of which the support layer can be stuck to an object (e.g. a container), and a narrower contact-adhesive region 62, which adheres to the top side of the support layer after wrapping the support layer around the container. The support layer is embodied as a gripping tab 34 on the narrower contact-adhesive region 62.

The top side of the support layer 30 can be labelled in a region 31, which is arranged above the adhesive-covering film 80. A region 32, arranged next to the region 31 on the top side of the support layer 30, can have an adhesive-resistant coating 33. By way of example, it is also possible for the entire top side of the support layer 30 to be coated in an adhesive-resistant fashion. The adhesive-resistant coating can be labelled in the region 31.

A material ply 10 is arranged in the region 32 on the top side of the support layer. The material ply 10 can, on its underside, be coated by means of an adhesive layer 70, and so the material ply 10 adheres to the top side of the support layer 30. The material ply 10 has a plurality of material sections 110, 120 and 130. The individual material sections of the material ply 10 can be separated along separation lines 11. By way of example, the separation lines 11 can be perforations provided in the material of the material ply 10. The material sections 110, 120 and 130 can have labelling 12 on a top side.

A further material ply 20 is arranged over the material ply 10. The material ply 20 is subdivided into a plurality of material sections 210, 220 and 230. The individual material sections can be separated along separation lines 21. The separation lines 21 can be embodied as cuts that separate the entire material of the material ply 20. Compared to the material ply 10, the material ply 20 is arranged such that the separation lines 11 in the material ply 10 and the separation lines 21 in the material ply 20 are arranged offset with respect to each other.

The individual material sections of the material ply 20 can each be subdivided into two regions. In a first region of each of the material sections of the material ply 20, an adhesive-resistant coating 50 is arranged on the underside thereof. A second, narrower region of each of the material sections of the material ply 20 has an adhesive layer 40 on the underside thereof. By way of example, the material section 210 comprises a region 211, on the underside of which the adhesive layer 40 is arranged, and a region 212, the underside of which is coated with the adhesive-resistant coating 50. The material section 220 has a region 221, on the underside of which the adhesive layer 40 is applied. A region 222 of the material section 220 is coated on the underside with the adhesive-resistant coating 50. The material section 230 has a narrower region 231, on the underside of which provision is made for the adhesive layer 40. The larger region 232 is covered on the underside by the adhesive-resistant coating 50. The material sections 210, 220 and 230 of the material ply 20 are coated on the underside such that the respectively narrower region 211, 221, 231 of the material sections is covered by the adhesive layer 40 and the respectively larger region 212, 222 and 232 is coated on the underside with the adhesive-resistant coating 50.

The material ply 20 is arranged offset to the material ply 10 such that either the adhesive layer 40 or the adhesive-resistant coating 50 is arranged between the separation lines 11 of the material ply 10 and the separation lines 21 of the material ply 20. Respectively one of the material sections 210, 220 and 230 and one material section 110, 120 and 130 overlap in an overlap region 111, 121 and 131 such that the adhesive layer 40 is arranged in the overlap region between the separation lines 11 and the separation lines 21. As a result of this the material section 210 of the material ply 20 adheres to the material section 110 of the material ply 10. As a result of the adhesive layer 40, the material section 220 adheres to the material section 120. As a result of the adhesive layer 40, the material section 230 of the material ply 20 adheres to the material section 130 of the material ply 10. As a result of the arrangement shown in FIG. 1, material sections of the various material plies that are arranged offset to each other adhere to each other. In the process, one material section of the first ply in each case adheres to respectively that material section of the second ply that is arranged behind the material section of the first ply in the dispensing direction.

Figure 2A:
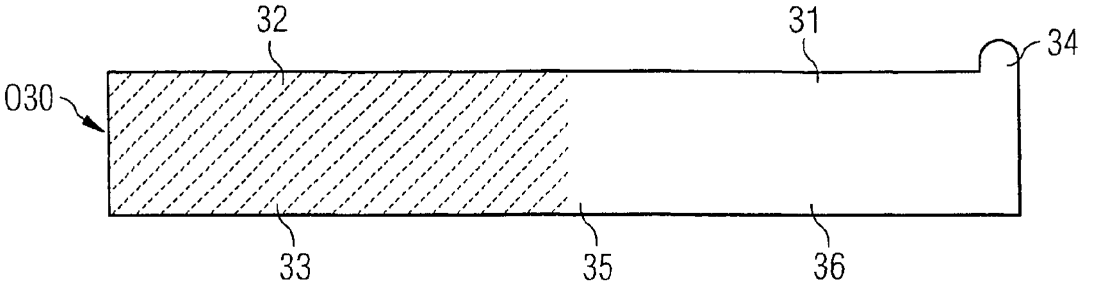
FIG. 2A shows an embodiment of a top side of a support layer of the label.

FIG. 2A shows a top side O30 of the support layer 30. The top side of the support layer 30 can have a labelling 36 in a region 31. By way of example, the labelling can contain information in respect of the contents of a container onto which the label is stuck using the contact-adhesive layer 60. By way of example, information in respect of the producer, the composition or the storage life of a pharmaceutical product can be contained in the region 31.

The region 32 situated next to the region 31 has an adhesive-resistant coating 33. FIG. 1 shows that the material ply 10 adheres to the adhesive-resistant coating 33 by means of the adhesive layer 70. This affords the possibility of separating a material section of the material ply 10 from the top side of the support layer 30, with the adhesive layer 70 still almost completely adhering to the underside of the separated material section. Since this results in the material section of the first material ply 10 remaining auto-adhesive, it can easily be stuck onto another object, for example an injection device. The adhesive-resistant coating 33 can also extend over the labelled region 31. The label can have a gripping tab 34 in its rear region in respect of the dispensing direction. For this, the support layer can be formed into a tab 34 at the rear end of the region 31 in the dispensing direction.

Figure 2B:
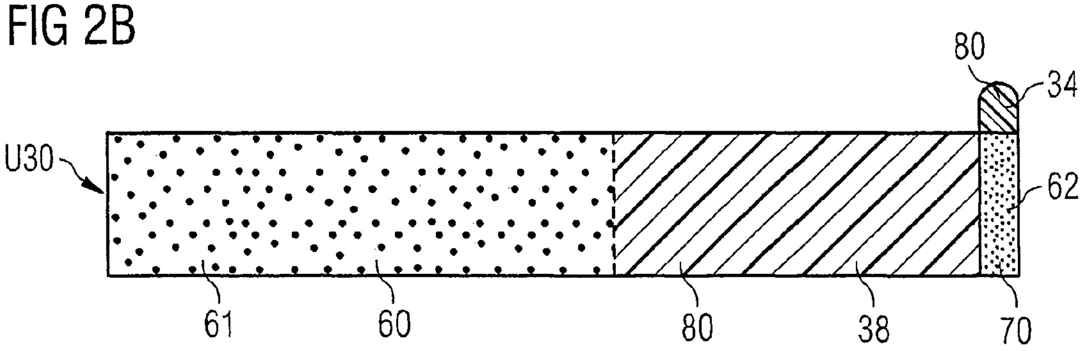
FIG. 2B shows an embodiment of an underside of the support layer of the label.

FIG. 2B shows a view of an underside U30 of the support layer 30. The underside of the support layer is coated with the contact-adhesive layer 60. As a result of this, the label can be stuck onto a container by means of the underside of the support layer. The adhesive-covering film 80 is arranged on the contact-adhesive layer 60 such that a region on the underside of the support layer, which is situated below the material ply 10 and the material ply 20, is covered by the contact-adhesive layer 60 and a neighboring region thereof on the underside of the support layer is covered by the adhesive-covering film 80. The adhesive-covering film 80 thus subdivides the underside of the support layer 30 into a larger adhesive region 61, which is situated towards the front in the dispensing direction, and an adhesive narrower region 62, which is situated towards the rear in the dispensing direction. The support layer is formed into a gripping tab 34 in the region of the support layer situated at the rear in the dispensing direction. The underside of the gripping tab is likewise covered by the adhesive-covering film 80.

The adhesive-covering film 80 has an adhesive-resistant surface, and so the support layer is not adhesive on the underside in those regions in which the adhesive-covering film has been applied. When wrapping a cylindrical container, for example a vial, using the label 1000, the larger contact-adhesive region 61 of the contact-adhesive layer 60 adheres to the container. The adhesive-covering film 80 covers the material plies 10 and 20 and the auto-adhesive region 37 of the support layer is stuck on in a region 35 on the top side of the support layer. The adhesive-covering film 80 thus lies as a protective covering over the material ply 10 and the material ply 20, or the record labels of the two material plies 10 and 20.

Figure 3A:
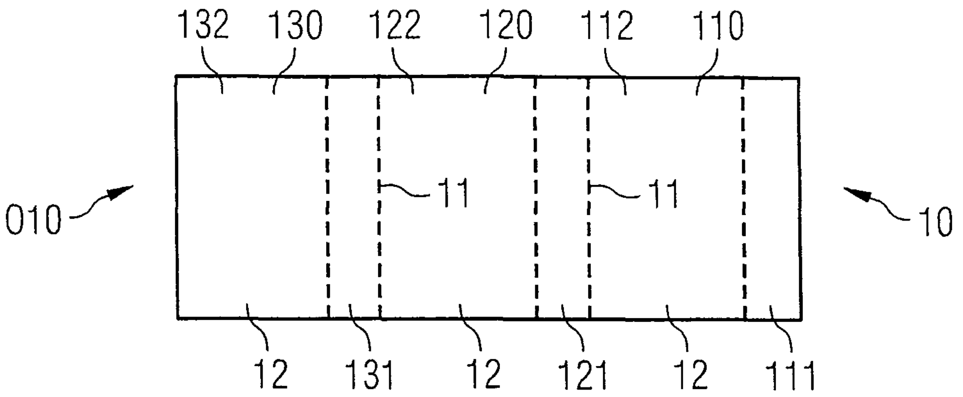
FIG. 3A shows a top side of a first material ply of the label.

FIG. 3A shows a top side O10 of the material ply 10. The material ply 10 comprises the material sections 110, 120 and 130, which can be separated along the separation lines 11. The separation lines 11 can for example be formed as perforations in the material of the material ply 10. Each material section can be subdivided into a narrower region 111, 121 and 131 and into a wider region 112, 122 and 132. In the narrower regions, a material section of the material ply 20 arranged offset to a material section of the material ply 10 adheres to the corresponding material section of the material ply 10. In the region 111, the material section 210 adheres to the material section 110 as a result of the adhesive layer 40 applied under the region 211. The region 121 of the material section 120 is stuck to the region 221 of the material section 220. In the region 131, the material section 130 sticks to the material section 230.

When one of the material sections of the material ply 10 is separated along the separation line 11, the material section of the material ply 20 adhering to the corresponding material section of the material ply 10 is also separated from the remaining material ply 20 along the separation line 21. Thus, individual record labels can be separated from the label, which individual record labels are each formed from a material section of the lower material ply 10 and a material section adhering thereto of the material ply 20 arranged over said lower material ply. A record label is formed from material sections, with a material section of the second material ply adhering to that material section of the first material ply that is arranged in front of the material section of the second ply in the dispensing direction.

In the embodiment illustrated in FIG. 1, the label 1 has three record labels. The first record label is formed by the material sections 110 and 210, which adhere to each other in an offset fashion. The record label arranged adjacent to this comprises the material sections 120 and 220. A further record label is formed by the material sections 130 and 230, which adhere to each other in an offset fashion.

Figure 3B:
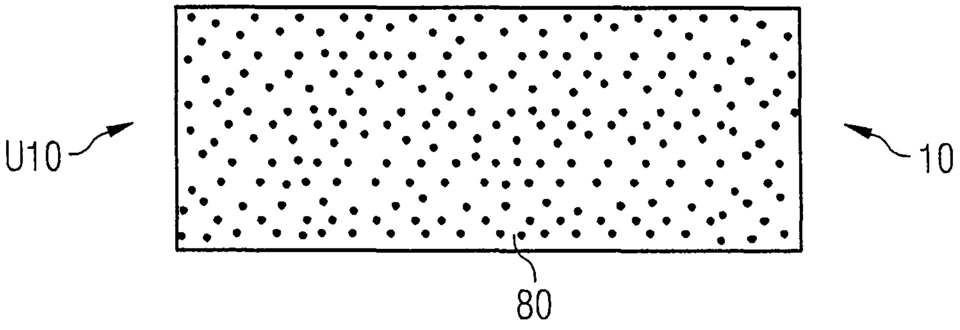
FIG. 3B shows an underside of the first material ply of the label.

FIG. 3B shows the underside U10 of the material ply 10. The entire underside of the material ply 10 is coated with the adhesive layer 70. As a result of this, the individual record labels have an auto-adhesive design. The record labels can for example be stuck onto an injection device by means of the adhesive layer 70.

Figure 4A:
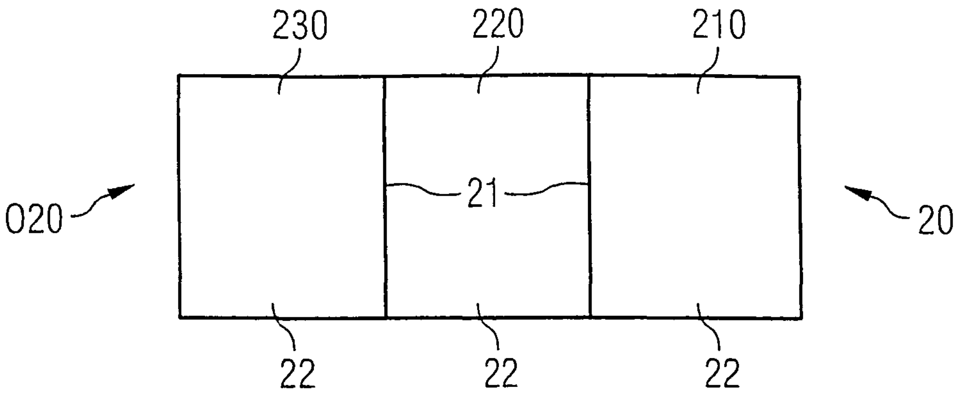
FIG. 4A shows a top side of a second material ply of the label.

FIG. 4A shows a top side O20 of the material ply 20. The material ply 20 comprises the material sections 210, 220 and 230, which can each be separated along the separation line 21. The separation line 21 can be embodied as a continuous cutting line within the material of the material ply 20. The individual material sections can have labelling 22 or can be labelled on the top side O20.

Figure 4B:
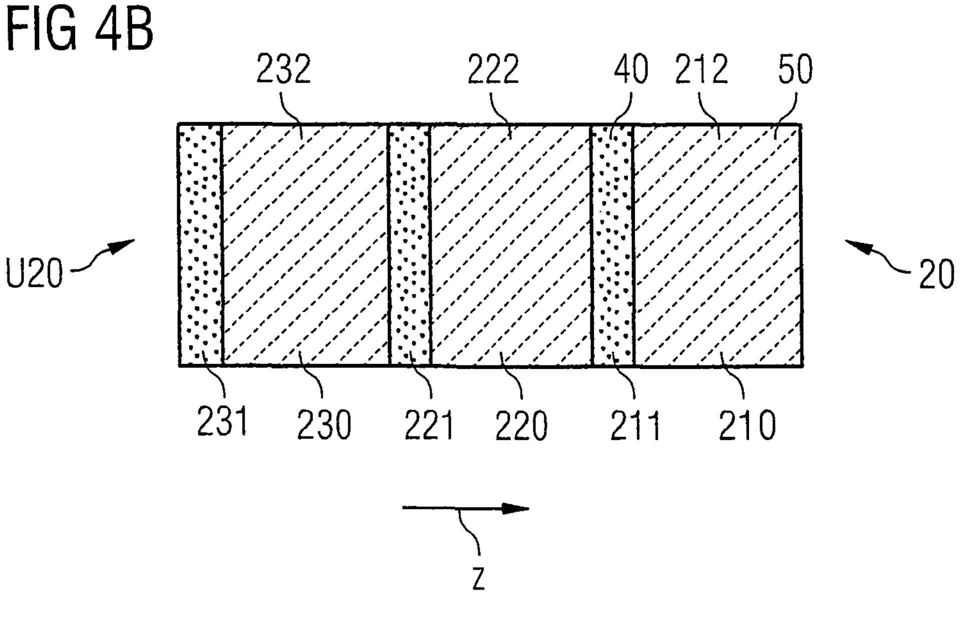
FIG. 4B shows an underside of the second material ply of the label.

FIG. 4B shows an underside U20 of the material ply 20. Each of the material sections can be subdivided into two regions. The region 211, 221 and 231 situated at the front in the dispensing direction of the label and belonging to the individual material sections is coated with the adhesive layer 40. The region 212, 222 and 232 situated at the rear in the dispensing direction and belonging to each material section is coated with the adhesive-resistant coating 50. The material sections 210, 220 and 230 in each case adhere in the regions 211, 221 and 231 to the material sections 110, 120 and 130 of the material ply 10, which sections are situated offset and below the first-mentioned sections.

Figure 5:
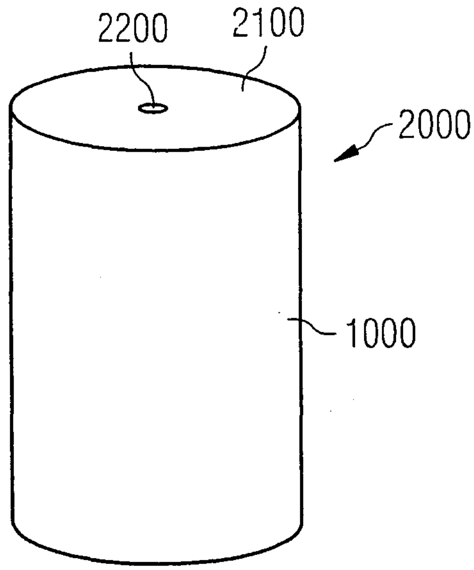
FIG. 5 shows a container provided for attaching the label.

FIG. 5 shows a cylindrical container 2000, onto which the label 1000 can be stuck. The container 2000 for example is a glass flask or a vial that stores a pharmaceutical substance, for example a liquid. The container can have a sealable opening 2200 on a top side 2100. By way of example, an injection needle of a syringe can be inserted through the sealable opening 2200. By pulling up the syringe the syringe body fills with a partial amount of the liquid located in the container 2000.

Figure 6:
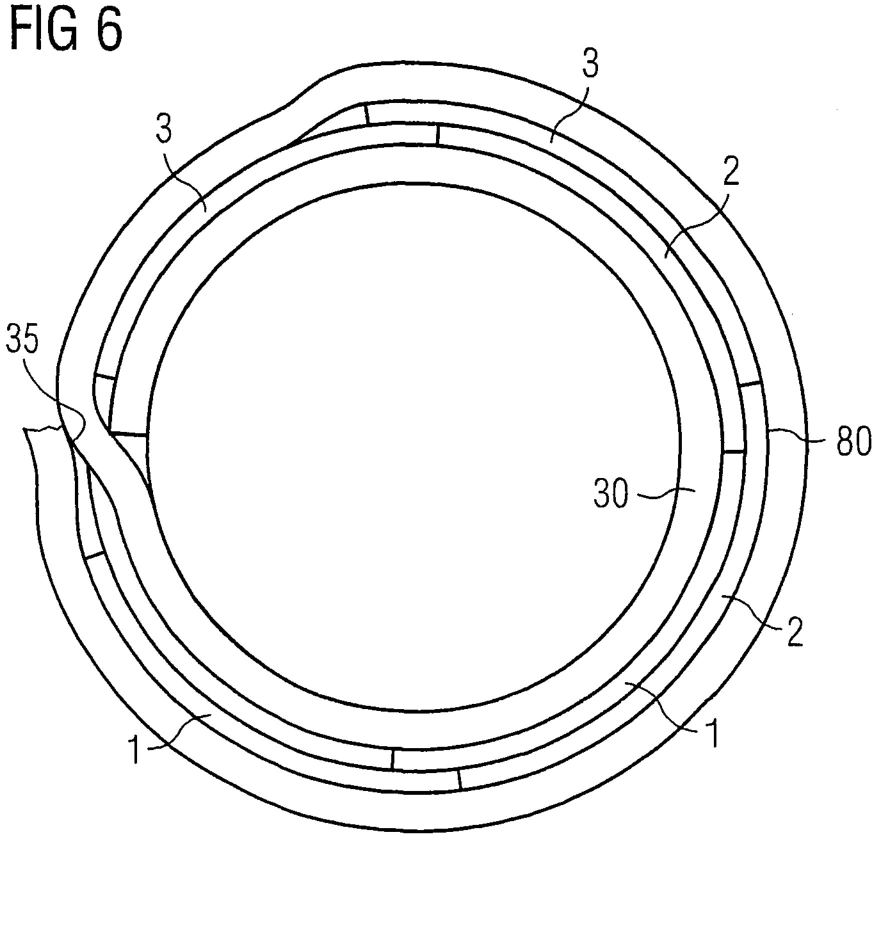
FIG. 6 shows an embodiment of the label in a transverse view after applying the label on a container.

FIG. 6 shows the label 1000 after it has been attached to the surface of the container 2000. For reasons of simplicity, it is merely the material plies 10 and 20 with their respective material sections and the support layer 30 that are illustrated. The support layer 30 is stuck onto the container by means of the contact-adhesive region 61 on its underside. The material plies 10 and 20 are attached to the top side of the support layer 30 in the region 33 of the top side of the support layer arranged above the auto-adhesive region 36.

The label has a length corresponding to approximately double the circumference of the container. The adhesive-covering film 80 has a length corresponding to approximately the circumference of the container. The lengths of the material plies 10 and 20 likewise correspond to approximately the circumference of the container. As a result, the label can be wrapped almost twice around the container.

In the second wrapping, the record label 1, formed by the material sections 110 and 210 adhering to each other in an offset fashion, the record label 2, formed by the material sections 120 and 220 adhering to each other in an offset fashion, and the record label 3, formed by the material sections 130 and 230 adhering to each other in an offset fashion, are covered by the adhesive-covering film 80. As a result of the adhesive-resistant effect of the adhesive-covering film 80, the support layer does not adhere to the record labels but acts as a protective cover for the record labels.

The contact-adhesive region 62 of the support layer adheres to the region 35 of the support layer. In order to separate a record label, the protective section 37 of the support layer is separated by releasing the gripping tab 34 and pulling off the contact-adhesive region 62 from the region 35 of the support layer. Thus, the individual record labels 1, 2, 3 are uncovered and can be separated in order, for example, to be applied to an injection device, which was filled with a small partial amount of the liquid in the container 2000.

The label constitutes a multi-ply composite that can be applied onto small containers, with it easily being possible for the individual record labels to be applied individually and partly adhering to an injection device, for example a syringe. As a result of the material plies arranged offset to each other, it is possible for the record labels to be attached onto the label in a space-saving fashion. This affords the possibility of providing a label with a length that can be processed by labelling machines, and which label nevertheless can have a plurality of separable parts in the form of record labels.

The invention claimed is:

1. Multi-ply label, comprising:

a first material ply (10), having at least a first and a second material section (110, 120), the first material ply being designed such that the first material section (110) of the first material ply (10) can be separated from the second material section (120) of the first material ply, a second material ply (20), having at least a first and a second material section (210, 220), the second material ply being designed such that the first material section (210) of the second material ply can be separated from the second material section (220) of the second material ply, the second material ply (20) being arranged above the first material ply (10), in which the first and second material plies (10, 20) are arranged with respect to each other such that the first material section (210) of the second material ply is separated from the second material section (220) of the second material ply when the first material section (110) of the first material ply (10) is separated from the second material section (120) of the first material ply and the first material section (210) of the second material ply (20) adheres to the first material section (110) of the first material ply (10), in which the first and second material sections (110, 120) of the first material ply each have a second region (112, 122) adjoining the respective first region (111, 121), and in which the respective second region (112, 122) of the first and second material sections of the first material ply has an adhesive-resistant coating (50) on the side facing the second material ply (20).

2. Multi-ply label according to claim 1, in which the first and second material plies (10, 20) are arranged with respect to each other such that the first material section (110) of the first material ply (10) and the first material section (210) of the second material ply (20) overlap.

3. Multi-ply label according to claim 1, in which the first material section (210) of the second material ply (20) has a first region (211) in which the first material section of the second material ply is connected to the first material section (110) of the first material ply.

4. Multi-ply label according to claim 3, comprising:

an adhesive layer (40) arranged under the first region 211) of the first material section (210) of the second material ply, as a result of which adhesive layer the first material section (210) of the second material ply (20) adheres to the first material section (110) of the first material ply.

5. Multi-ply label according to claim 4, in which the adhesive layer (40) is arranged between the first region (111) of the first material section (110) of the first material ply and the first region (211) of the first material section of the second material ply.

6. Multi-ply label according to claim 3, in which the first material section (210) of the second material ply has a second region (212) adjoining the first region (211) of the first material section, which second region has an adhesive-resistant coating (50).

7. Multi-ply label according to claim 1, in which the first and second material plies (10, 20) are arranged with respect to each other such that the second material section (120) of the first material ply (10) and the second material section (220) of the second material ply overlap.

8. Multi-ply label according to claim 1, in which the second material section (220) of the second material ply (20) has a first region (221) in which the second material section (220) of the second material ply is connected to the second material section (120) of the first material ply.

9. Multi-ply label according to claim 8, comprising:

an adhesive layer (40) arranged under the first region (221) of the second material section of the second material ply, as result of which adhesive layer the second material section (220) of the second material ply adheres to the second material section (120) of the first material ply.

10. Multi-ply label according to claim 8, in which the second material section (220) of the second material ply has a second region (222) adjoining the first region, which second region has an adhesive-resistant coating (50), in which the second region (222) of the second material section of the second material ply and the first material section (110) of the first material ply overlap.

11. Multi-ply label according to claim 10, in which the respective second region (212, 222) of the first and second material sections of the second material ply can be labelled on the side (O20) facing away from the first material ply (10).

12. Multi-ply label according to claim 8, in which the second material section (120) of the first material ply has a first region (121) in which the second material section (120) of the first material ply is connected to the first region (221) of the second material section of the second material ply.

13. Multi-ply label according to claim 8, in which the adhesive layer (40) is arranged between the first region (121) of the second material section of the first material ply and the first region (221) of the second material section of the second material ply.

14. Multi-ply label according to claim 1, in which the first material section (110) of the first material ply has a first region (111) in which the first material section (110) of the first material ply is connected to the first region (211) of the first material section of the second material ply.

15. Multi-ply label according to claim 1, in which the first and second material sections (110, 120) of the first material ply and the first and second material sections (210, 220) of the second material ply can each be separated along a separation line (11, 21).

16. Multi-ply label according to claim 15, in which the first and second material plies (10, 20) are arranged with respect to each other such that the separation lines (11) of the first material ply (10) are offset from the separation lines (21) of the second material ply (20).

17. Multi-ply label according to claim 1, in which a perforation (11) is arranged between the first and second material sections (110, 120) of the first material ply.

18. Multi-ply label according to claim 1, in which a cutting line (21) is arranged between the first and second material sections (210, 220) of the second material ply, by means of which cutting line the material of the second material ply (20) is severed.

19. Multi-ply label according to claim 1, in which the respective second region (112, 122) of the first and second material sections of the first material ply contains container content information present on the side of the first material ply facing the second material ply (20).

20. Multi-ply label according to claim 1, comprising:

a support layer (30) with a first side (O30) and a second side (U30), the first material ply (10) being arranged on the first side (O30) of the support layer, a contact-adhesive layer (60), the contact-adhesive layer (60) being arranged on the second side (U30) of the support layer.

21. Multi-ply label according to claim 20, in which an adhesive layer (70) is arranged on the side of the first material ply (10) facing the support layer (30).

22. Multi-ply label according to claim 20, in which the support layer (30) can be labelled in a first region (31) on the first side (O30), in which the support layer is coated in a second region (32) on the first side with an adhesive-resistant coating (33).

23. Multi-ply label according to claim 20, comprising:

an adhesive-covering film (80), the adhesive-covering film (80) being arranged on the contact-adhesive layer (60) such that the contact-adhesive layer (60) is subdivided into a first contact-adhesive region (61) and into a second contact-adhesive region (62), the second contact-adhesive region (62) being spaced apart from the first contact-adhesive region (61) and being narrower than the first contact-adhesive region (61).

24. Multi-ply label according to claim 23, in which the adhesive-covering film (80) has an extent in a longitudinal direction (z) of the label corresponding at least to the extent of the first and second material plies (10, 20) in the longitudinal direction of the label.

25. Multi-ply label according to claim 23, wherein the support film (30) has a gripping tab (34).

* * * * *